United States Patent [19]

Amit

[11] Patent Number: 4,710,284

[45] Date of Patent: Dec. 1, 1987

[54] CYCLONIC SEPARATOR

[75] Inventor: Meir Amit, Nethanya, Israel

[73] Assignee: Amiad, Korazim, Israel

[21] Appl. No.: 791,610

[22] Filed: Oct. 25, 1985

[30] Foreign Application Priority Data

Oct. 26, 1984 [IL] Israel ........................................ 73329

[51] Int. Cl.$^4$ .............................................. B03B 5/66
[52] U.S. Cl. ...................... 209/17; 209/157; 209/210; 209/211; 209/156; 209/158; 210/512.1; 210/304
[58] Field of Search ............. 209/13, 17, 18, 155–161, 209/210, 211; 210/512.1, 304; 406/173

[56] References Cited

U.S. PATENT DOCUMENTS

| 4,120,783 | 10/1978 | Baummer | 209/210 X |
| 4,199,443 | 4/1980 | Tauber | 210/304 X |
| 4,298,465 | 11/1981 | Druffel | 210/512.1 X |
| 4,312,751 | 1/1982 | Casamitjana | 210/512.1 X |

FOREIGN PATENT DOCUMENTS

| 333400 | 11/1958 | Switzerland | 210/512.1 |
| 577344 | 5/1946 | United Kingdom | 210/512.1 |

*Primary Examiner*—Joseph J. Rolla
*Assistant Examiner*—David H. Bollinger
*Attorney, Agent, or Firm*—Benjamin J. Barish

[57] ABSTRACT

A cyclonic separator for separating solid particles from a fluid comprises a housing including a chamber, a first deflector between the chamber and its inlet for deflecting the fluid flowing from the inlet to a radially-extending passageway before reaching the chamber, and a second deflector between the radially-extending passageway and the chamber for deflecting the fluid in the circumferential direction before entering the chamber to produce a vortex therein for separation of solid particles from the fluid before the fluid reaches the chamber outlet. The housing further includes a dirt-purging outlet at the bottom of the chamber for purging the solid particles settling therein.

17 Claims, 3 Drawing Figures

4,710,284

CYCLONIC SEPARATOR

BACKGROUND OF THE INVENTION

The present invention relates to cyclonic separators for separating solid particles from a fluid. The invention is particularly applicable in cyclonic separators, sometimes called hydrocyclonic separators, for separating dirt and other solid particles from irrigating water, and is therefore below with respect to this application.

Most irrigation systems require filters or other forms of separators for removing the dirt particles from the irrigating water in order to prevent clogging of the irrigation devices, such as sprinklers, sprayers and drippers, used in the irrigation system. A large number of separators are known for this purpose. One known type is the cyclonic or hydrocyclonic separator, in which a vortex is produced within a chamber to separate the solid particles by centrifugal action. The conventional manner of producing the vortex is to introduce the fluid tangentially to the chamber.

An object of the present invention is to provide a novel cyclonic separator having advantages over the known separators in a number of respects to be described more fully below.

SUMMARY OF THE INVENTION

According to a broad aspect of the present invention, there is provided a cyclonic separator for separating solid particles from a fluid, comprising a housing including a chamber, a fluid inlet into said chamber, and a fluid outlet from said chamber; first deflector means between said inlet and said chamber for deflecting the fluid flowing from the inlet to a radially-extending passageway before reaching said chamber; second deflector means between said radially-extending passageway and said chamber for deflecting the fluid in the circumferential direction before entering said chamber to produce a vortex therein for separation of solid particles from the fluid before the fluid reaches the housing outlet; and a dirt purging outlet at the bottom of said chamber for purging the solid particles settling therein.

According to an important preferred feature in the embodiments of the invention described below, the first deflector means is displaceable to enlarge or restrict the radially-extending passageway, and includes biassing means biassing it in the direction of restricting the passageway but is displaceable by the inletted fluid in the direction of enlarging the passageway.

According to further important features included in the preferred embodiments of the invention described below, the radially-extending passageway is defined by the displaceable deflector and a radially-extending wall fixed within the chamber; the inlet extends to a central opening in the radially-extending wall; the displaceable deflector is a disc parallel to the radially-extending wall and aligned with its central opening; and the second deflector means includes vanes fixed to the radially-extending wall along its outer circumference.

According to still further features in the described preferred embodiments, the housing inlet includes a first tube coaxial to the longitudinal axis of the chamber and terminates at the central opening of the radially-extending wall; the outlet includes a second tube coaxial to but of larger diameter than the first tube and terminating short of the radially-extending wall; and the longitudinal axis of the chamber and of the first and second tubes are disposed vertically during use of the separator.

The foregoing features permit the construction of cyclonic separators having a number of important advantages over the known devices. One important advantage is that the cyclonic separator is effective to separate the solid particles from the fluid even at relatively low flow rates of the fluid. A further advantage is that, by the use of the deflector which is displaceable to enlarge or restrict the radially-extending passageway, the separator is self-regulating with respect to the flow rates to assure that the required vortex is produced under all flow rates. The foregoing features further permit the separator to have an off-line construction, with the fluid entering and leaving from the center, thereby facilitating the cleaning of the filter and providing a large volume for the dirt to settle. These features also permit the separator to act as a non-return valve, preventing reverse flow, and also enable a fertilizer feeding device to be connected to the separator for introducing fertilizer into the fluid (water) when the separator is used in a water irrigation system.

The foregoing features and advantages, as well as further ones, will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
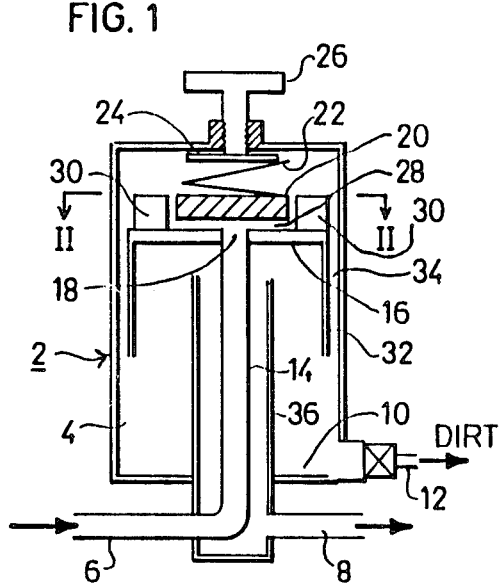
FIG. 1 diagrammatically illustrates one form of cyclonic separator constructed in accordance with the present invention.

The cyclonic separator illustrated in FIG. 1 is particularly for use in a water irrigation system, for separating dirt or other solid particles from the irrigating water in order to prevent clogging of the irrigating devices. The illustrated separator comprises a housing 2 including an internal chamber, generally designated 4, an inlet 6 for inletting the water into chamber 4, and an outlet 8 through which the water flows after removal of the dirt particles therefrom in chamber 4. The dirt particles settle at the bottom 10 of chamber 4 and are removed via a dirt purging outlet 12.

Inlet 6 enters housing 2 through its center and includes a tube 14 extending longitudinally of the housing and coaxial with its longitudinal axis. A radially-extending wall 16 is fixed within housing 2 at the upper end thereof but is spaced from the inner face of the housing. Wall 16 is formed with a central opening 18 for the water inletted via inlet 6 and inlet tube 14, the latter tube being joined to wall 16.

A deflector disc 20 is disposed within housing 2 on the opposite (upper) side of radially-extending wall 16 and aligned with its central opening 18. Disc 20 is biassed towards opening 18 of wall 16 by a spring 22 interposed between the disc and a bearing member 24 carried by a screw 26 threadedly passing through the top wall of housing 2. Screw 26 is accessible externally of the housing for manual rotation in order to vary the biassing force applied by spring 22 with respect to deflector disc 20.

It will thus be seen that deflector disc 20 defines a radially-extending passageway 28 between its lower face and the upper face of the radially-extending wall 16, through which passageway the water inletted via inlet tubes 6 and 14 is deflected by disc 20.

The upper face of radially-extending wall 16 carries a plurality of vanes 30 around its outer circumference, which vanes are effective to deflect the water from passageway 28 to a circumferential (or tangential) direction in order to produce a vortex within chamber 4. The bottom face of wall 16 carries a depending cylindrical sleeve or shroud 32, which is also spaced from the inner face of housing 2, and therefore defines therewith an annular passageway 34 for the water vortex produced by vanes 30. It is this water vortex in annular passageway 34 which effects the separation of dirt particles from the water before the water reaches the housing outlet 8.

The housing outlet 8 is connected to an outlet tube 36 which also extends longitudinally of housing 2 but terminates short of the radially-extending wall 16. Outlet tube 36 is coaxial to inlet tube 14 but is of larger diameter than the inlet tube. The termination point of outlet tube 36 is between the lower end of cylindrical wall 32 and the lower face of the radially-extending wall 16 so as to receive the water after it has passed in the form of a vortex through the annular passageway 34.

The separator illustrated in FIGS. 1 and 2 operates as follows:

The water inletted via inlet 6 passes through the inlet tube 14 and opening 18 through the radially-extending wall 16, and impinges against deflector disc 20. The disc deflects the water through the radially-extending passageway 28 outwardly of wall 16 to impinge against vanes 30, which vanes then deflect the water in a circumferential (or tangential) direction thereby producing a vortex as the water continues through annular passageway 34. The vortex causes the solid particles to separate by centrifugal action, the solid particles settling at the bottom 10 of chamber 4. The water then continues to the upper end of the outer tube 36 and through outlet 8. The bottom 10 of chamber 4 may be periodically purged of the dirt particles via dirt purging outlet 12.

During the operation of the separator, deflector disc 20 is displaced towards or away from radially-extending wall 16 according to the rate of flow of the water through the inlet tubes 6 and 14 to assure that the rate of flow of the water impinging against vanes 30 is sufficient to produce the required vortex. Thus, if the flow rate through inlet 6 is low, spring 22 will bias deflector disc 20 towards wall 16 to decrease the cross-sectional area of passageway 28, and if the inlet flow rate is large, the disc 20 will be displaced away from wall 16 by the inflowing water to increase the cross-sectional area of passageway 28. The illustrated arrangement thus produces the required vortex under all flow rates.

Another important advantage in the illustrated construction is that the inlet 6 and outlet 8 enter the separator housing 2 from its center; the inlet includes vertical tube 14 and the outlet includes vertical tube 36 both of which extend for a substantial portion of the vertical height of the housing. This arrangement permits the separator to take an off-line construction, which is preferable in many applications; provides an internal chamber 4 of large volume for the dirt to settle; and simplifies cleaning the separator.

Figure 2:
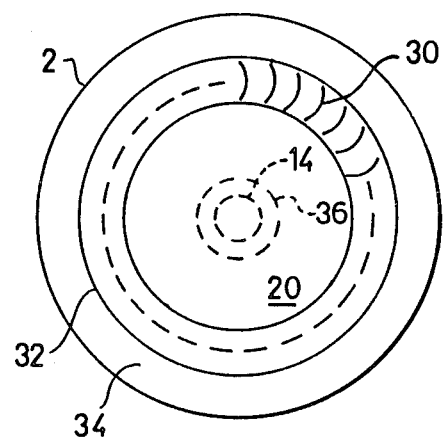
FIG. 2 is a view along lines II—II of FIG. 1.

A still further advantage in the construction illustrated in FIGS. 1 and 2 is that the separator also acts as a non-return valve, in that it permits the water (or other fluid) to flow from the inlet 6 to the outlet 8, but not in the reverse direction. The illustrated separator thus obviates the need for a separate non-return valve, which is commonly included in separator assemblies to prevent reverse flow of the water.

Figure 3:
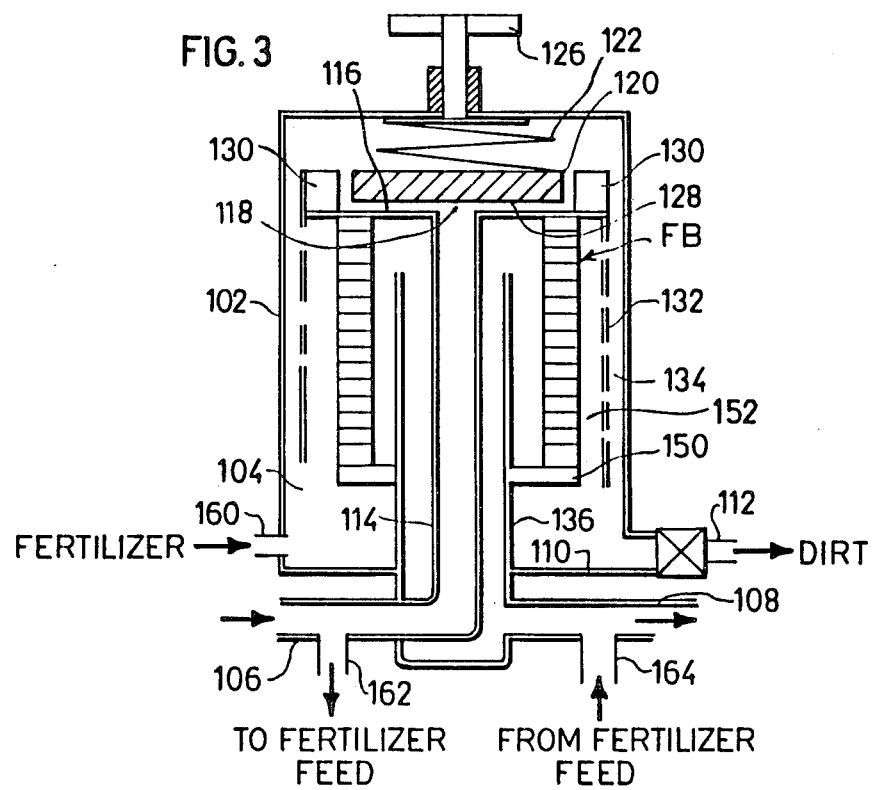
FIG. 3 diagrammatically illustrates another cyclonic separator constructed in accordance with the present invention.

FIG. 3 illustrates a cyclonic separator very similar to that of FIGS. 1 and 2, but including several additional features, primarily a filter body, therein designated FB, for removing finer particles not removed by centrifugal force, and also connections to a fertilizer feeding device for introducing fertilizer into the irrigating water.

Thus, the separator illustrated in FIG. 3 also includes a housing 102 having an internal chamber 104, inlet tubes 106 and 114, and outlet tubes 136 and 108; a radially-extending disc 116 formed with a central opening 118 connected to the inlet tube 114; a deflector disc 120 overlying opening 108 and a portion of disc 116 to define a radially-extending passageway 128; and a plurality of vanes 130 fixed to the outer circumference of wall 116. Disc 120 is biased towards wall 116 by a spring 122 applying a force to the disc which can be varied by a manipulatable screw 126.

As in FIGS. 1 and 2, a cylindrical wall 132 is secured to the outer circumference of wall 116, except that in FIG. 3, wall 132 is extended for a greater portion of the length of chamber 104 to provide a long annular passageway 134 between wall 132 and the inner face of housing 102. A further radially-extending wall 150 is fixed to the outlet tube 136 at approximately the level of the end of cylindrical wall 132, but is spaced from the latter wall to provide a passageway 152 for the water after leaving the annular passageway 134. Filter body FB, of cylindrical construction, is disposed between radial walls 116 and 150 so as to filter the water (or other fluid) passing from annular passageway 134 to the upper end of the outlet tube 136.

It will thus be seen that the filter illustrated in FIG. 3 operates in substantially the same manner as described above with respect to FIGS. 1 and 2, except that any dirt particles not separated in the vortex produced in annular passageway 134 are separated by filter FB body before the water reaches the outlet tube 136. The so-separated particles accumulate on the outer face of the filter body FB and some may fall into the bottom 110 of the separator housing 102 for purging through the dirt-purging outlet 112.

Filter body FB may be a stack of discs, a cylindrical screen, or any other type of cylindrical filter construction.

The separator illustrated in FIG. 3 further includes an additional inlet 160 connectable to a fertilizer feeding device (not shown) for introducing fertilizer into the water to be outletted via outlet 108 to the irrigating devices. In the arrangement illustrated in FIG. 3, the fertilizer input 160 is downstream of the annular passageway 134 wherein the vortex is formed for separating the larger particles by centrifugal action, but is upstream of the filter body FB. Such an arrangement would be preferred when the fertilizer is of the solution type but which may include solid particles that are to be removed, in this case by the filter body FB, before the water reaches the irrigating devices.

One known type of fertilizer feeding device operates by applying a head of water to the fertilizer container for feeding the fertilizer through the fertilizer outlet. For use with this type of fertilizer feeding device, the inlet pipe 106 is provided with a further outlet 162 leading to the inlet pipe of the fertilizer feeding device, which inlet pipe extends to the top of the feeder for producing the water head therein; and the separator outlet 108 is provided with another connection 164 connectable to the water outlet at the bottom of the fertilizer feeding device.

While the invention has been described with respect to two preferred embodiments, it will be appreciated that many other variations, modifications and applications of the invention may be made.

I claim:

1. A cyclonic separator for separating solid particles from a fluid, comprising:
    a housing including a chamber, a fluid inlet into said chamber, a fluid outlet from said chamber, and a radially-extending passageway between said inlet and said chamber;
    first deflector means between said inlet and said chamber for deflecting the fluid flowing from said inlet to said radially-extending passageway before reaching said chamber;
    said first deflector means being displaceable to enlarge or restrict said radially-extending passageway, and including biassing means biassing it in the direction of restricting said passageway but displaceable by the inletted fluid in the direction of enlarging said passageway,
    second deflector means between said radially-extending passageway and said chamber for deflecting the fluid in the circumferential direction before entering said chamber to produce a vortex therein for separation of the solid particles from the fluid before the fluid reaches the housing outlet;
    and a dirt-purging outlet at the bottom of said chamber for purging the solid particles settling therein.

2. The separator according to claim 1, wherein said radially-extending passageway is defined by said first deflector means and a radially-extending wall fixed within said chamber.

3. The separator according to claim 2, wherein said inlet extends through a central opening in said radially-extending wall, and said first deflector means is a disc parallel to said radially-extending wall and aligned with said central opening therethrough.

4. The separator according to claim 3, wherein said second deflector means includes vanes fixed to said radially-extending wall along the outer circumference thereof.

5. The separator according to claim 4, wherein said inlet includes a first tube coaxial to the longitudinal axis of the chamber and terminating at said central opening of said radially-extending wall, and said outlet includes a second tube coaxial to but of larger diameter than said first tube and terminating short of said radially-extending wall.

6. The separator according to claim 5, wherein said longitudinal axis of the chamber and said first and second tubes are disposed vertically during use of the separator.

7. The separator according to claim 3, further including a cylindrical wall having one end joined to said radially-extending wall and the opposite end open to the interior of said chamber, said cylindrical wall defining an annular passegeway for the fluid downstream of said radially-extending passageway and said second deflector means.

8. The separator according to claim 3, wherein said chamber includes a filter body between said second deflector means and said outlet for filtering the fluid flowing into said outlet.

9. The separator according to claim 8, wherein said housing inlet is connected to a source of irrigating water, and said chamber includes an inlet for a fertilizer feeding device for adding fertilizer to said irrigating water.

10. The separator according to claim 9, wherein said inlet from the fertilizer feeding device is upstream of said filter body.

11. A cyclonic separator for separating solid particles from a fluid, comprising:
    a housing including a chamber, a fluid inlet into said chamber, a fluid outlet from said chamber, and a radially-extending passageway between said inlet and said chamber;
    first deflector means between said inlet and said chamber for deflecting the fluid flowing from said inlet to a radially-extending passageway before reaching said chamber, said first deflector means being displaceable to enlarge or restrict said radially-extending passageway;
    said radially-extending passageway being defined by said first deflector means and a radially-extending wall fixed within said chamber;
    second deflector means between said radially-extending passageway and said chamber for deflecting the fluid in the circumferential direction before entering said chamber to produce a vortex therein for separation of the solid particles from the fluid before the fluid reaches the housing outlet;
    a cylindrical wall having one end joined to said radially-extending wall and the opposite end open to the interior of said chamber, said cylindrical wall defining an annular passageway for the fluid downstream of said radially-extending passageway and said second deflector means;
    and a dirt-purging outlet at the bottom of said chamber for purging the solid particles settling therein.

12. The separator according to claim 11, wherein said inlet extends through a central opening in said radially-extending wall, and said first deflector means is a disc parallel to said radially-extending wall and aligned with said central opening therethrough.

13. The separator according to claim 12, wherein said second deflector means includes vanes fixed to said radially-extending wall along the outer circumference thereof.

14. The separator according to claim 13, wherein said inlet includes a first tube coaxial to the longitudinal axis of the chamber and terminating at said central opening of said radially-extending wall, and said outlet includes a second tube coaxial to but of larger diameter than said first tube and terminating short of said radially-extending wall.

15. The separator according to claim 14, wherein said longitudinal axis of the chamber and said first and second tubes are disposed vertically during use of the separator.

16. The separator according to claim 11, wherein said first deflector means includes biassing means biassing it in the direction of restricting said passageway but displaceable by the inletted fluid in the direction of enlarging said passageway.

17. The separator according to claim 11, wherein said chamber includes a filter body between said second deflector means and said outlet for filtering the fluid flowing into said outlet.

* * * * *